US009792138B2

(12) United States Patent
Kaplan et al.

(10) Patent No.: US 9,792,138 B2
(45) Date of Patent: Oct. 17, 2017

(54) VIRTUAL MACHINE MIGRATION TO HYPER VISORS WITH VIRTUAL FUNCTION CAPABILITY

(71) Applicant: Red Hat Israel, Ltd., Raanana (IL)

(72) Inventors: Alona Kaplan, Raanana (IL); Michael Kolesnik, Ramat Gan (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/625,560

(22) Filed: Feb. 18, 2015

(65) Prior Publication Data
US 2016/0239328 A1   Aug. 18, 2016

(51) Int. Cl.
*G06F 9/455* (2006.01)

(52) U.S. Cl.
CPC .. *G06F 9/45558* (2013.01); *G06F 2009/4557* (2013.01); *G06F 2009/45595* (2013.01)

(58) Field of Classification Search
CPC ............... G06F 9/45558; G06F 2009/4557
USPC .............................................. 718/1
See application file for complete search history.

(56) References Cited

U.S. PATENT DOCUMENTS

| | | | |
|---|---|---|---|
| 7,484,208 B1 * | 1/2009 | Nelson | G06F 9/45558 718/1 |
| 8,533,713 B2 | 9/2013 | Dong | |
| 8,645,605 B2 | 2/2014 | Subramaniyan et al. | |
| 9,336,042 B1 * | 5/2016 | Brenneman | H04L 41/0813 |
| 9,348,655 B1 * | 5/2016 | Tsirkin | G06F 9/5088 |
| 2009/0007099 A1 * | 1/2009 | Cummings | G06F 9/45558 718/1 |
| 2011/0194563 A1 * | 8/2011 | Shen | H04L 67/1002 718/1 |
| 2012/0023494 A1 * | 1/2012 | Harrison | G06F 21/53 718/1 |
| 2012/0054393 A1 | 3/2012 | Yoshimura | |
| 2012/0096459 A1 * | 4/2012 | Miyazaki | G06F 9/45558 718/1 |
| 2012/0185856 A1 * | 7/2012 | Ashihara | G06F 9/4856 718/1 |
| 2012/0195182 A1 * | 8/2012 | Pommereau | A61M 5/31511 369/127 |
| 2012/0278802 A1 * | 11/2012 | Nilakantan | G06F 9/45558 718/1 |

(Continued)

OTHER PUBLICATIONS

Xiao et al. "Dynamic Resource Allocation Using Virtual Machines for Cloud Computing Environment", Jun. 2013, IEEE vol. 24, No. 6.*

(Continued)

*Primary Examiner* — Anna Deng
*Assistant Examiner* — Junchun Wu
(74) *Attorney, Agent, or Firm* — Lowenstein Sandler LLP (57) ABSTRACT

A virtualization manager receives a request to migrate a virtual machine from a source hypervisor to a destination hypervisor supporting virtual function capability. Responsive to determining that an availability status indicates that a virtual function is available for use on the destination hypervisor by the virtual machine, the virtualization manager migrates the virtual machine from the source hypervisor to the destination hypervisor. Responsive to determining that the virtual machine has been migrated to the destination hypervisor successfully, the virtualization manager connects the identified virtual function to the virtual machine.

17 Claims, 5 Drawing Sheets

(56) References Cited

U.S. PATENT DOCUMENTS

| | | | | |
|---|---|---|---|---|
| 2012/0284712 | A1* | 11/2012 | Nimmagadda | G06F 9/5077 718/1 |
| 2012/0297379 | A1* | 11/2012 | Anderson | G06F 9/45558 718/1 |
| 2013/0081015 | A1* | 3/2013 | Noma | G06F 9/45558 718/1 |
| 2013/0086583 | A1 | 4/2013 | Uemura et al. | |
| 2013/0111474 | A1* | 5/2013 | Agarwal | G06F 9/45558 718/1 |
| 2013/0139154 | A1* | 5/2013 | Shah | G06F 9/45558 718/1 |
| 2013/0152076 | A1* | 6/2013 | Patel | G06F 9/45558 718/1 |
| 2013/0254767 | A1 | 9/2013 | Mizuno et al. | |
| 2013/0283266 | A1* | 10/2013 | Baset | G06F 9/485 718/1 |
| 2013/0311988 | A1* | 11/2013 | Boss | G06F 9/4862 718/1 |
| 2014/0108756 | A1* | 4/2014 | Brown | G06F 3/0619 711/162 |
| 2015/0052282 | A1* | 2/2015 | Dong | G06F 13/32 710/308 |

OTHER PUBLICATIONS

Ajila et al. "Efficient Live Wide Area VM Migration with IP Address Change Using Type II Hypervisor", 2013, IEEE.*
Dong et al. "High performance network virtualization with SR-IOV", 2012, Elsevier.*
Li et al. "HyperMIP: Hypervisor controlled Mobile IP for Virtual Machine Live Migration across Networks", 2008, IEEE.*
Martin Polednik, "Re: [ovirt-devel] SR-IOV Feature," Devel Mail Archive, Nov. 4, 2014, [retrieved Dec. 23, 2014], 4 pages, Internet: <https://www.mail-archive.com/devel©ovirt.org/msg02222.html>.
No Author, "SR-IOV-Passthrough-for-Networking—OpenStack," Wiki Openstack, [retrieved Dec. 23, 2014], 5 pages, Internet: <https://wiki.openstack.org/wiki/SR-IOV-Passthrough-For-Networking>.
No Author, "Assign a Virtual Function as SR-IOV Passthrough Adapter to a Virtual Machine by Using the vSphere Web Client," vSphere 5.5 Documentation Center, [retrieved Dec. 23, 2014], 2 pages, Internet: https://pubs.vmware.com/vsphere-55/index.jsp?topic=%2Fcom.vmware.vsphere.networking.doc%2FGUID-898A3D66-9415-4854-8413-B40F2CB6FF8D.html>.

* cited by examiner

VIRTUAL MACHINE MIGRATION TO HYPERVISORS WITH VIRTUAL FUNCTION CAPABILITY

TECHNICAL FIELD

The present disclosure is generally related to computer systems, and more particularly, to virtual device management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

A VM may comprise one or more "virtual devices," each of which may map to a physical device of the host machine (e.g., a network interface device, an I/O device such as a CD-ROM drive, a disk array, etc.). Single Root I/O Virtualization (SR-IOV) enables a single physical I/O device (e.g., a single Ethernet port) to appear as multiple, separate physical devices. A virtualization management system, or "virtualization manager," can manage the allocation of resources from host machines to VMs, monitor the status of the VMs, as well as the progress of commands and processes being executed by the VMs, and generally manage operations in the system.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for migrating virtual machines to SR-IOV capable hypervisors. SR-IOV is a virtualization networking specification that uses physical function (PFs) and virtual functions (VFs). Physical functions are full-featured PCIe devices that include all configuration resources and capabilities for the device. Virtual functions are "lightweight" PCIe functions that contain the resources necessary for data movement, but have a carefully minimized set of configuration resources. A virtual machine's virtual device (e.g., a vNIC) can be connected directly to a virtual function instead of a virtual network bridge, bypassing virtual networking on the host to reduce latency between the VM and the physical device and lower CPU utilization devoted to packet transfer.

Providing connectivity to a virtual machine using SR-IOV capable devices can provide substantial performance gains. However, it can complicate management of virtualized environments when migrating a virtual machine between SR-IOV capable and non-SR-IOV capable hypervisors. For example, an administrator may place a hypervisor without SR-IOV capability into a state that can require all virtual machines for that hypervisor be migrated to another hypervisor. If the only other hypervisors in the environment are those that are SR-IOV capable, virtual machines may lose connectivity, fail startup, or may need to remain shut down until maintenance has completed.

Aspects of the present disclosure address the above noted deficiency by supporting migration of virtual machines to SR-IOV capable hypervisors. It should be noted that although, for simplicity, aspects of the present disclosure have been described below with respect to the SR-IOV specification, in some implementations they may be applied to any specification or protocol that can provide similar virtual function capability for physical interfaces. Additionally, it should be noted that aspects of the present disclosure may be applied in implementations where a virtual machine can be migrated between hypervisors that both have virtual function capability, where a virtual machine can be migrated from a hypervisor without virtual function capability to a hypervisor with virtual function capability, where a virtual machine can be migrated from a hypervisor with virtual function capability to a hypervisor without virtual function capability, etc.

In an illustrative example, a virtualization manager can receive a request to migrate a virtual machine from source hypervisor to a destination hypervisor that can support virtual function capability (e.g., a SR-IOV capable hypervisor). The source hypervisor may be either SR-IOV capable or not. The request to migrate the virtual machine may be received from a user (e.g., an administrator) of the virtual machine initiating manual migration via a user interface for the virtualization manager (e.g., a graphical user interface, command line interface, etc.), from an administrator placing the source hypervisor into maintenance mode (causing all virtual machines to be migrated to other hypervisors), as a result of a change in the environment that causes the virtualization manager to initiate a virtual machine migration (e.g., a virtual function becomes available for use by a waiting virtual machine), or in any similar manner.

The virtualization manager can identify a logical network associated with the virtual machine on the source hypervisor that may need to be available on the destination hypervisor supporting virtual function capability in order for the virtual machine to function correctly. The virtualization manager may then identify an SR-IOV virtual function associated with the logical network on the destination hypervisor supporting virtual function capability. In some implementations, the virtualization manager may first identify a physical interface supporting virtual function capability (e.g., an SR-IOV physical function) on the destination hypervisor that is associated with the logical network, and then determine if the physical interface supporting virtual function capability has any available virtual functions that may be assigned to the virtual machine.

The virtualization manager may identify available virtual functions according to an availability status associated with each virtual function for the physical interface that can indicate whether the virtual function is available for assignment or has already been assigned to a virtual machine. The availability status can be stored as a value (e.g., a Boolean value, integer value, etc.) to indicate whether the virtual function is mapped to a unique identifier for the virtual function (e.g., using a name alias, number, etc.). The availability status may be stored locally by the virtualization manager in a data store, in a memory space, or in any similar manner. Alternatively, the virtualization manager may receive the availability status for each virtual function when it identifies the physical interface supporting virtual function capability on the destination hypervisor. Once the virtualization manager identifies an available virtual function that can be assigned to the virtual machine upon successful migration of the virtual machine to the destination hypervisor, the virtualization manager may then proceed with migrating the virtual machine. Subsequently, the virtualization manager may modify the availability status of the virtual function to indicate that it is no longer available for assignment. This can prevent the virtual function from being assigned elsewhere while the virtual machine is being migrated.

The virtualization manager may then create a temporary virtual network associated with the identified logical network on the destination hypervisor supporting virtual function capability. In certain implementations, the temporary virtual network may be composed of a connection between the virtual machine and the identified logical network without virtual function capability (e.g., non-SR-IOV capable). For example, the temporary virtual network may be a virtual bridge, virtual switch, or VLAN that connects the virtual machine to the physical device associated with the logical network without an associated virtual function.

In some implementations, prior to initiating migration of the virtual machine to the destination hypervisor, the virtualization manager may send a notification to the requestor to confirm migration of the virtual machine. For example, if the request originated with a user (e.g., an administrator) via a user interface (e.g., a graphical user interface, command line interface, etc.), the virtualization manager may send a request to the user to confirm migration of the virtual machine. This may be accomplished by displaying a notification screen, window, or dialog box on the user interface that notifies the user that migrating the virtual machine may be harmful (e.g., may cause data loss, connectivity problems, etc.). The notification may contain a button, checkbox, or other method of soliciting input from the user to confirm migration virtual device or to cancel the migration. Once confirmed by the user, the virtualization manager may proceed with the migration.

The virtualization manager may then migrate the virtual machine from the source hypervisor to the destination hypervisor supporting virtual function capability using any available live migration technique (e.g., pre-copy, post-copy, etc.). Once a sufficient state of the virtual machine has been migrated to the destination hypervisor supporting virtual function capability, the virtualization manager may connect the virtual interface of the virtual machine to the temporary virtual network on the destination hypervisor supporting virtual function capability. The state of the virtual machine may comprise a predetermined state of various components of the virtual machine that are necessary for the virtual machine to begin execution on the destination host. For example, the state of the virtual machine may comprise a device state, the state of CPU registers, the pages of memory that are currently being accessed by the virtual machine, or the like. The state of the virtual machine may be migrated by copying the state from the source host to the destination host directly through the network, placing the state in a shared space for the destination host to retrieve, or in any other manner.

Upon determining that the virtual machine has been migrated to the destination hypervisor supporting virtual function capability successfully, the virtualization manager may then connect the identified SR-IOV virtual function to the virtual machine. The virtualization manager may first configure the virtual interface of the virtual machine to connect to the identified SR-IOV virtual function. In some implementations, the virtualization manager may configure the virtual interface as a 'passthrough' to the virtual function and configure the virtual network parameters of the virtual function. The virtual network parameters may include a maximum transmission unit (MTU) that defines the maximum size of a packet that can be transferred in one frame over a network, a virtual local area network (VLAN) tag that identifies the VLAN associated with the virtual network for packet transmission, a media access control (MAC) address that identifies the interface for communication across the network, or similar network parameters. Once the virtual interface has been configured, the virtualization manager may disconnect the virtual interface of the virtual machine from the temporary virtual network. Upon successful disconnect from the temporary virtual network, the virtualization manager may then connect the virtual interface with the virtual function. In certain implementations, the virtualization manager may then remove the temporary virtual network from the destination hypervisor supporting virtual function capability. Alternatively, the virtualization manager may retain the temporary virtual network to support future virtual machine migrations or additions to the destination hypervisor.

If the virtualization manager determines that the virtual machine has not been migrated to the destination hypervisor successfully, the virtualization manager may release or unlock the virtual function for assignment elsewhere. For example, the virtualization manager may modify the availability status of the virtual function to indicate that the virtual function is available. In certain implementations, the virtualization manager may then remove the temporary virtual network from the destination hypervisor. Alternatively, the virtualization manager may retain the temporary virtual network to support future virtual machine migrations or additions to the destination hypervisor.

Aspects of the present disclosure are thus capable of facilitating the migration of virtual machines to hypervisors supporting virtual function capability. More particularly, aspects of the present disclosure can provide the ability for a virtualization manager to migrate a virtual machine to a destination hypervisor while providing virtual function capability to the virtual machine upon successful completion of the virtual machine migration.

Figure 1:
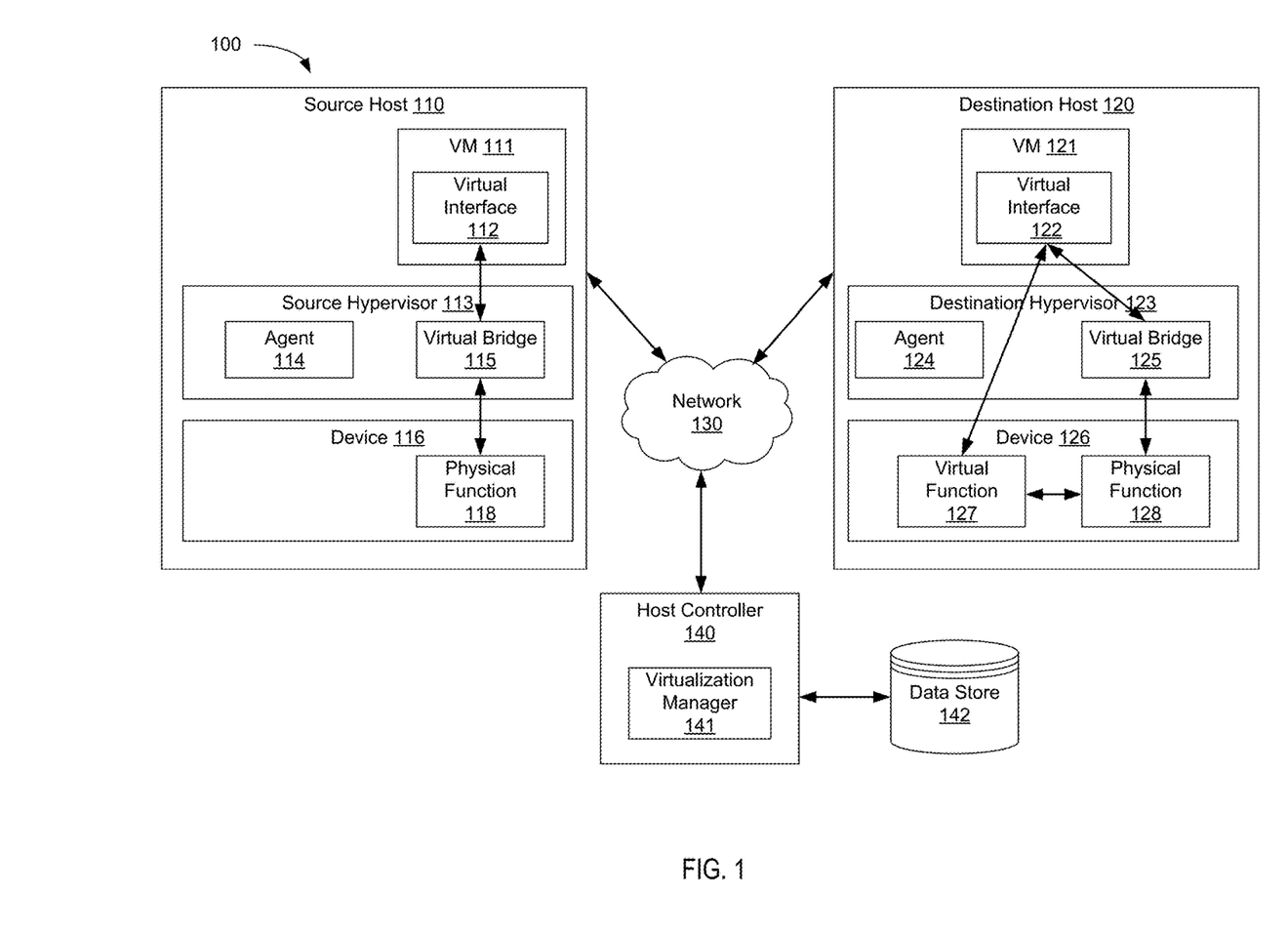
FIG. 1 depicts a high-level component diagram of an example computer system architecture, in accordance with one or more aspects of the present disclosure.

FIG. 1 depicts a high-level component diagram of an illustrative example of a network architecture 100, in accordance with one or more aspects of the present disclosure. One skilled in the art will appreciate that other architectures for network architecture 100 are possible, and that the implementation of a network architecture utilizing examples of the invention are not necessarily limited to the specific architecture depicted by FIG. 1.

The network architecture 100 includes one or more source hosts 110 coupled to one or more destination hosts 120 over a network 130. The network 130 may be a private network (e.g., a local area network (LAN), wide area network (WAN), intranet, etc.) or a public network (e.g., the Internet). The source hosts 110 and destination hosts 120 may also be coupled to a host controller 140 (via the same or a different network or directly). Host controller 140 may be an independent machine such as a server computer, a desktop computer, etc. Alternatively, the host controller 140 may be part of the source host 110 or destination host 120

Source host 110 may comprise server computers or any other computing devices capable of running one or more virtual machines (VM) 111. Each VM 111 runs a guest operating system (OS) (not pictured) that may be different from one virtual machine to another. The guest OS may include Microsoft Windows, Linux, Solaris, Mac OS, etc. Source host 110 may also comprise a source hypervisor 113 that emulates the underlying hardware platform for VM 111. The source hypervisor 113 may also be known as a virtual machine monitor (VMM) or a kernel-based hypervisor. The source host 110 may also comprise one or more devices 116 available on source host 110 (e.g., a network interface device, an I/O device such as a CD-ROM driver, a disk array, etc.) that may or may not support virtual function capability.

The source hypervisor 113 may comprise agent 114 that monitors VMs (e.g., VM 111) that may run on source host 110. Agent 114 can monitor VM runtime status, hardware configuration, network and storage connectivity on the source host 110, and similar VM-related and host-related statistical information. Agent 114 may store this information as it is collected for later use by virtualization manager 141. For example, agent 114 may save this information in a local memory space. Alternatively, agent 114 may save the information to a data store accessible by the source host 110. Agent 114 can send and receive information regarding VM 111 via an API that allows agent 114 to communicate with other components of network architecture 100. Agent 114 may additionally provide information upon request from virtualization manager 141 relating to the devices that support virtual function capability to facilitate virtual machine migration as described in detail below with respect to FIGS. 3 and 4. Source hypervisor 113 may additionally comprise virtual bridge 115 that can be used to connect a virtual interface of one or more of VMs 111 to a physical device that may not support virtual function capability.

Device 116 may or may not support virtual function capabilities for use with virtual interfaces 112 of VM 111. In FIG. 1, device 116 depicts a device that does not support virtual function capability, comprising physical function 118, which may not be connected to any virtual functions. In other implementations, device 116 may support both virtual function capability as well as connectivity via a virtual bridge. VM 111 may comprise a virtual interface 112 that provides connectivity to one of the devices 116 of source host 110. VM 111 depicts a virtual interface 112 that is connected to physical function 118 of device 116 via virtual bridge 115.

Each VM 111 may be linked to one or more virtual disks (not shown). These virtual disks can be logical partitions of a physical disk managed by source hypervisor 113, can be cloud based storage devices, or can be some other type of virtual storage device. In one embodiment, virtual disks may form a whole or part of a logical data center. In one embodiment, VM 111 and virtual disks, together with source host 110, may be collectively referred to as entities in a virtual machine system.

Destination host 120 may comprise server computers or any other computing devices capable of running one or more virtual machines (VM) 121. Each VM 121 runs a guest operating system (OS) (not pictured) that may be different from one virtual machine to another. The guest OS may include Microsoft Windows, Linux, Solaris, Mac OS, etc. Destination host 120 may also comprise a destination hypervisor 123 that emulates the underlying hardware platform for VM 121. The destination hypervisor 123 may also be known as a virtual machine monitor (VMM) or a kernel-based hypervisor. The destination host 120 may also comprise one or more devices 126 available on destination host 120 (e.g., a network interface device, an I/O device such as a CD-ROM driver, a disk array, etc.) that may or may not support virtual function capability.

The destination hypervisor 123 may comprise agent 124 that monitors VMs (e.g., VM 121) that may run on destination host 120. Agent 124 can monitor VM runtime status, hardware configuration, network and storage connectivity on the destination host 120, and similar VM-related and host-related statistical information. Agent 124 may store this information as it is collected for later use by virtualization manager 141. For example, agent 124 may save this information in a local memory space. Alternatively, agent 124 may save the information to a data store accessible by destination host 120. Agent 114 can send and receive information regarding VM 121 via an API that allows agent 124 to communicate with other components of network architecture 100. Agent 124 may additionally provide information upon request from virtualization manager 141 relating to the devices that support virtual function capability to facilitate virtual machine migration as described in detail below with respect to FIGS. 3 and 4. Destination hypervisor 123 may additionally comprise virtual bridge 125 that can be used to connect a virtual interface of one or more of VMs 121 to a physical device that may not support virtual function capability. In some implementations, virtual bridge 125 may be created by virtualization manager 141 as a component of a temporary virtual network to facilitate the migration of a virtual machine from source host 110 to destination host 120.

Device 126 may or may not support virtual function capabilities for use with virtual interfaces 112 of VM 111. In FIG. 1, device 126 depicts a device supporting virtual function capability (e.g., SR-IOV capable) as well as connectivity via a virtual bridge 125. Device 126 comprises virtual function 127 and physical function 128. Virtual function 127 can comprise resources necessary for data movement, but with a minimized set of configuration resources (e.g., SR-IOV PCIe virtual functions). It should be noted that although for simplicity only one virtual function 127 is depicted, in other implementations, multiple virtual functions 127 may be present. Physical function 128 can comprise a full-featured PCIe device that includes all configuration resources and capabilities for device 126. Virtual function 127 may be assigned to virtual interface 122 in order to provide VM 121 access to physical function 128. As noted above, virtual bridge 125 may be created by virtualization manager 141 as a component of a temporary virtual network to facilitate the migration of a virtual machine from source host 110 to destination host 120. Virtual bridge 125 may be used to provide connectivity between VM 121 and physical function 128 until the migration has completed, at which point virtualization manager may disconnect virtual interface 122 from virtual bridge 125, and then connect virtual interface 122 to virtual function 127 to provide the required connectivity. Virtualization manager 141 may subsequently remove virtual bridge 125 from hypervisor 123.

Each VM 121 may be linked to one or more virtual disks (not shown). These virtual disks can be logical partitions of a physical disk managed by destination hypervisor 123, can be cloud based storage devices, or can be some other type of virtual storage device. In one embodiment, virtual disks may form a whole or part of a logical data center. In one embodiment, VM 121 and virtual disks, together with destination host 120, may be collectively referred to as entities in a virtual machine system.

A host controller 140 can manage VMs 111 and VMs 121. Host controller 140 may manage the allocation of resources from source host 110 to VMs 111, as well as the allocation of resources from destination host 120 to VMs 121. In addition, host controller 140 may initiate the migration VMs 111 to destination host 120. In some implementations host controller 140 may run on a separate physical machine from source host 110 and destination host 120. Alternatively, host controller 140 may run locally on either source host 110 or destination host 120. The host controller 130 may include a virtualization manager 141 to perform the migration operations as described in detail below with respect to FIGS. 3-4. The host controller 140 may also maintain a data store 142 to store information pertaining to the various devices 116 and device 126 in the virtualization system (e.g., virtual interfaces, virtual disks, etc.). The data store 142 may share the machine with the host controller 140 (e.g., a disk drive in the host controller computer) or be an independent device coupled to the host controller directly or via a network (e.g., as a network-attached storage device (NAS)).

Figure 2:
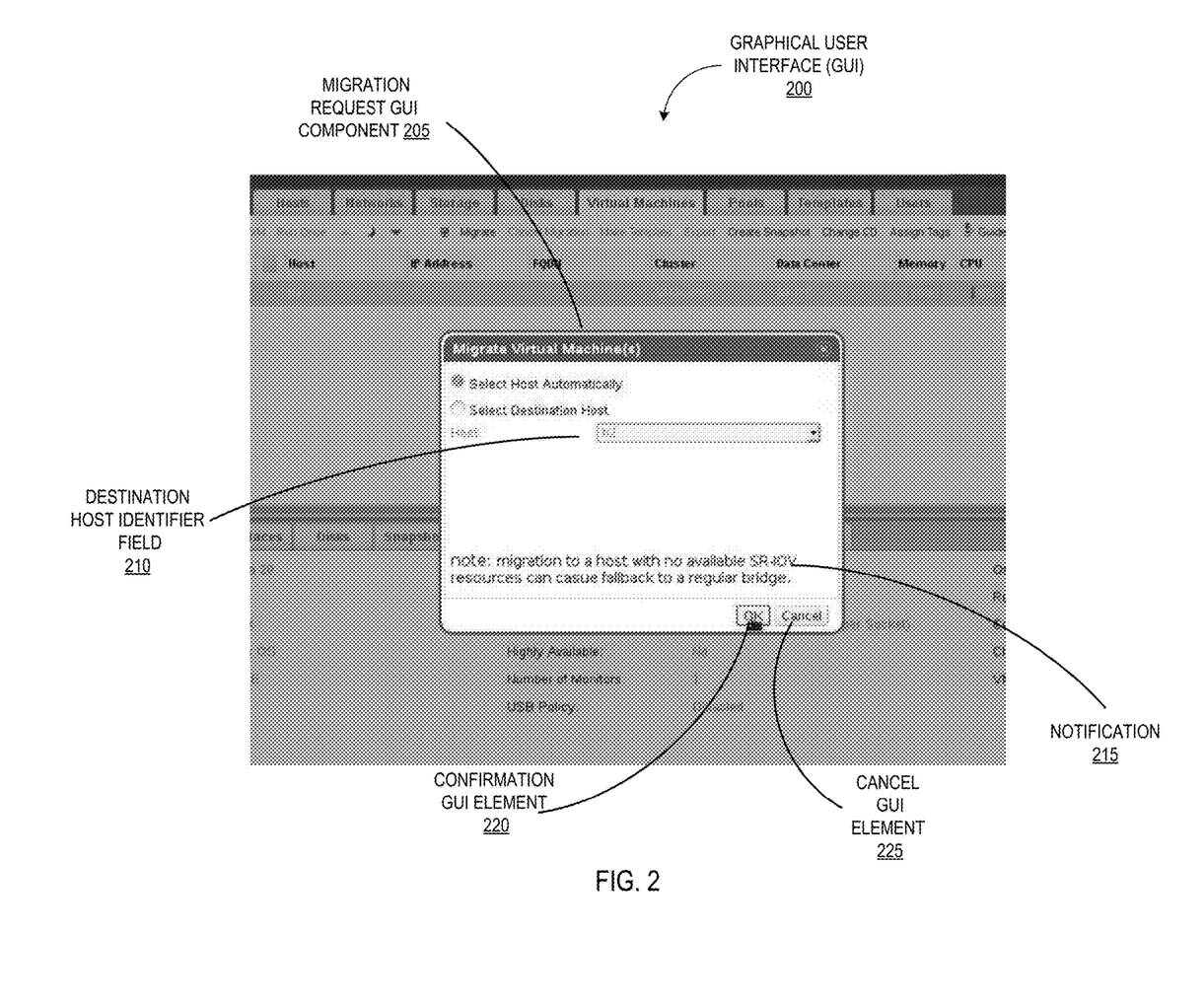
FIG. 2 illustrates an example of a graphical user interface (GUI) for migrating a virtual machine to a hypervisor with virtual function capability, in accordance with one or more aspects of the present disclosure.

FIG. 2 illustrates an example of a graphical user interface (GUI) 200 for migrating a virtual machine to a hypervisor with virtual function capability. GUI 200 may be presented by a stand-alone application, a component of a user interface for a virtualization manager, or in any other manner. For example, GUI 200 may be presented to a user by virtualization manager 141 of FIG. 1 as described in detail below with respect to FIGS. 3-4.

GUI 200 may present migration request GUI component (e.g., a popup window) 205 to a user in order to submit a request to a virtualization manager to migrate a virtual machine. The user may enter identification information in destination host identifier field 210 that can specify the destination host for the virtual machine migration. Destination host identifier field 210 may be a unique identifier (e.g., an IP address, network alias, or the like) that identifies a particular host available to the virtualization manager.

Notification 215 can be a message or text presented to the user to request confirmation of the migration request or otherwise notify the user of potential consequences of the migration request. As shown in FIG. 2, notification 215 notifies the user that the migration of a virtual machine to a host without virtual function capability can have negative consequences (e.g., may result in failover to a virtual bridge connection).

Once the user selects the confirmation GUI element 220 on migration request GUI component 205, the virtualization manager can initiate the virtual machine migration as described in detail below with respect to FIGS. 3-4. If the migration fails, the virtualization manager may display an alert to the user using notification 215. The user may then elect an alternative destination host and attempt to migrate the virtual machine to the alternative destination host. Alternatively, the user may cancel the migration request by selecting the cancel GUI element 225. In FIG. 2, confirmation GUI element 220 and cancel GUI element 225 are represented as buttons on a graphical user interface, but in other implementations can be links, dropdown lists, checkboxes, or any other GUI elements that provide similar functionality.

Figure 3:
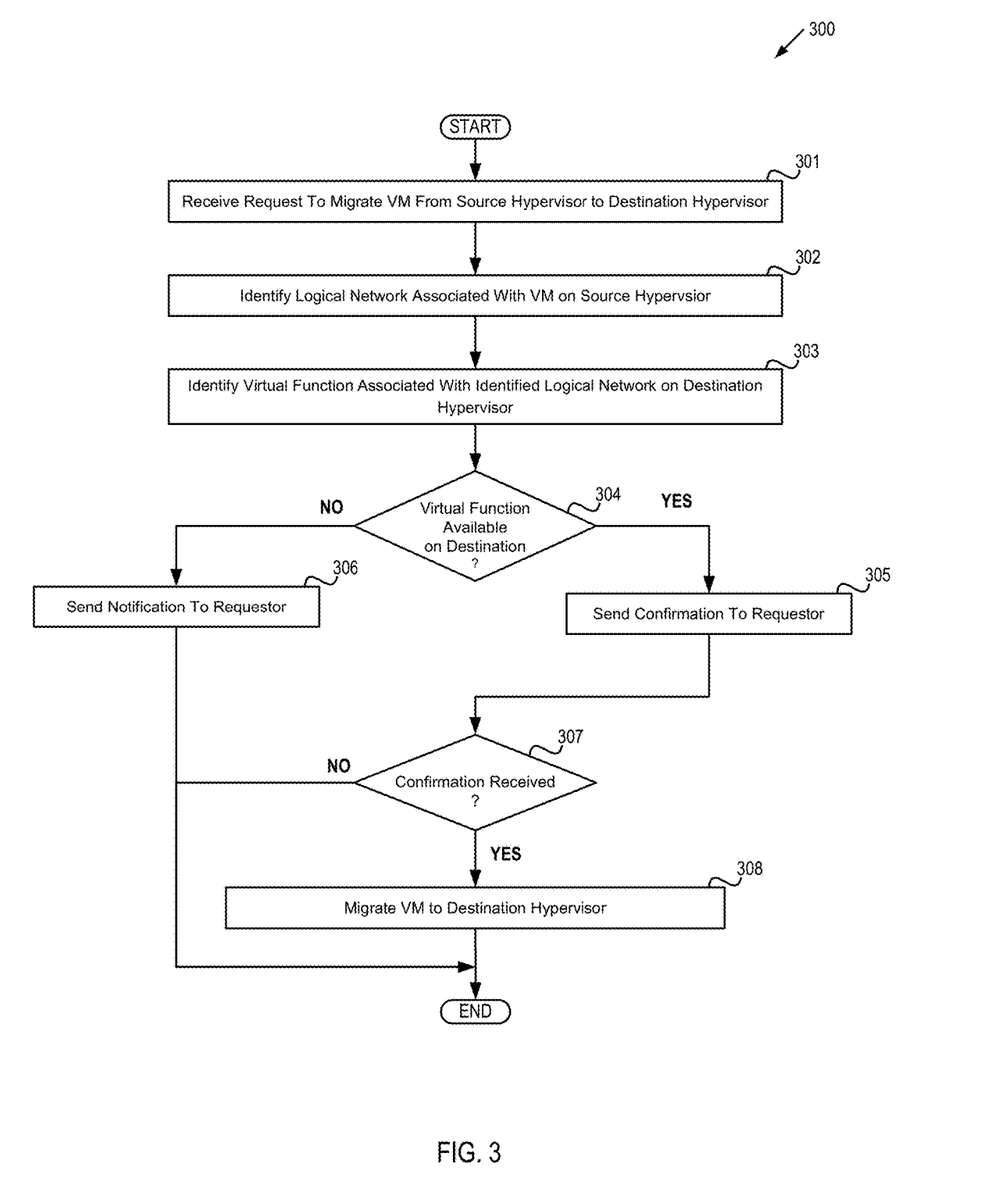
FIG. 3 depicts a flow diagram of a method for facilitating virtual machine migration to a hypervisor with virtual function capability, in accordance with one or more aspects of the present disclosure.

FIG. 3 depicts a flow diagram of an example method 300 for facilitating virtual machine migration to a hypervisor with virtual function capability. The method may be performed by processing logic that may comprise hardware (circuitry, dedicated logic, etc.), software (such as is run on a general purpose computer system or a dedicated machine), or a combination of both. In one illustrative example, method 300 may be performed by virtualization manager 141 of host controller 140 in FIG. 1. Alternatively, some or all of method 300 might be performed by another module or machine. It should be noted that blocks depicted in FIG. 3 could be performed simultaneously or in a different order than that depicted.

At block 301, processing logic receives a request to migrate a virtual machine from a source hypervisor to a destination hypervisor supporting virtual function capability. The source hypervisor may be either SR-IOV capable or not. The request to migrate the virtual machine may be received from a user (e.g., an administrator) of the virtual machine initiating manual migration via a user interface for the virtualization manager (e.g., a graphical user interface, command line interface, etc.), from an administrator placing the source hypervisor into maintenance mode (causing all virtual machines to be migrated to other hypervisors), as a result of a change in the environment that causes the virtualization manager to initiate a virtual machine migration (e.g., a virtual function becomes available for use by a waiting virtual machine), or in any similar manner.

At block 302, processing logic identifies a logical network associated with the virtual machine on the source hypervisor that may need to be available on the destination hypervisor in order for the virtual machine to function correctly.

At block 303, processing logic identifies a virtual function on the destination hypervisor that is associated with the logical network that was identified at block 302. In some implementations, processing logic may first identify a physical interface supporting virtual function capability (e.g., an SR-IOV physical function) on the destination hypervisor that is associated with the logical network, and then determine if the physical interface supporting virtual function capability has any available virtual functions that may be assigned to the virtual machine.

At block 304, processing logic branches depending on whether processing logic determines that there is an available virtual function on the destination hypervisor. If so, processing continues to block 305. Otherwise, processing proceeds to block 306. Processing logic may identify available virtual functions according to an availability status associated with each virtual function for the physical interface that can indicate whether the virtual function is available for assignment or has already been assigned to a virtual machine. The availability status may be stored locally by the virtualization manager in a data store, in a memory space, or in any similar manner.

At block 305, processing logic sends a notification to the requestor to confirm to the migration of the virtual machine. For example, if the request originated with a user (e.g., an administrator) via a user interface (e.g., a graphical user interface, command line interface, etc.), the virtualization manager may send a request to the user to confirm migration of the virtual machine. This may be accomplished by displaying a notification screen, window, or dialog box on the user interface that notifies the user that migrating the virtual machine may be harmful (e.g., may cause data loss, connectivity problems, etc.). The notification may contain a button, checkbox, or other method of soliciting input from the user to confirm migration virtual device or to cancel the migration. Processing then proceeds to block 307.

At block 306, processing logic sends a notification to the requestor that indicates that there are no virtual functions available. In some implementations, an alert may be presented on a window of a user interface. After block 306, the method of FIG. 3 terminates.

At block 307, processing logic determines whether confirmation has been received. Once confirmed by the requestor (e.g., by the user clicking a confirmation button on an alert window of a graphical user interface), the virtualization manager may proceed with the migration. At block 308, processing logic initiates migration of the virtual machine to the destination hypervisor. In some implementations, processing logic may migrate the virtual machine as further described with respect to the method of FIG. 4. After block 308, the method of FIG. 3 terminates.

Figure 4:
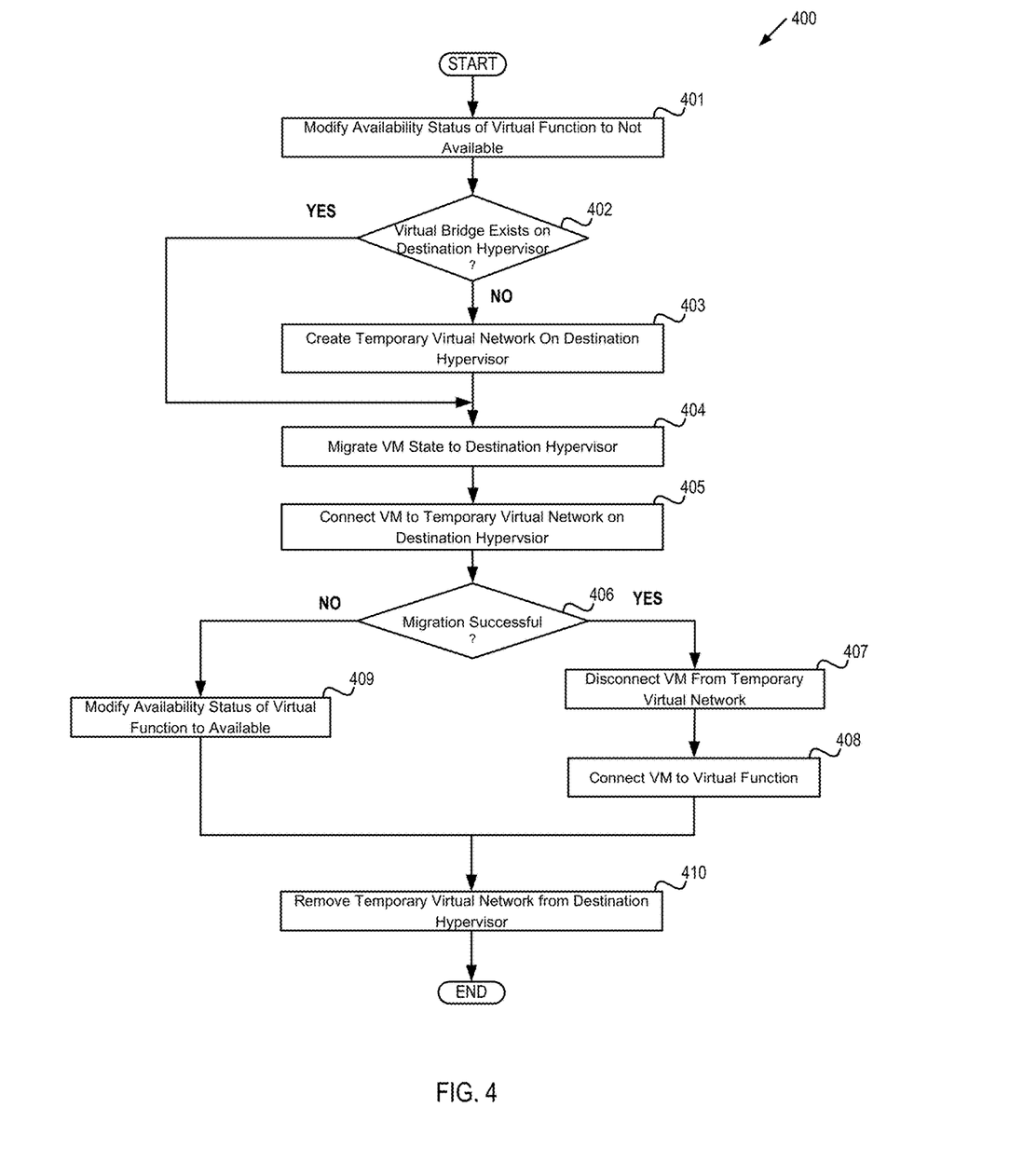
FIG. 4 depicts a flow diagram of a method for migrating a virtual machine to a hypervisor with virtual function capability, in accordance with one or more aspects of the present disclosure.

FIG. 4 depicts a flow diagram of an example method 400 for migrating a virtual machine to a hypervisor with virtual function capability. The method may be performed by processing logic that may comprise hardware (circuitry, dedicated logic, etc.), software (such as is run on a general purpose computer system or a dedicated machine), or a combination of both. In one illustrative example, method 400 may be performed by virtualization manager 141 of host controller 140 in FIG. 1. Alternatively, some or all of method 400 might be performed by another module or machine. It should be noted that blocks depicted in FIG. 4 could be performed simultaneously or in a different order than that depicted.

At block 401, processing logic modifies the availability status of an identified virtual function on a destination hypervisor in preparation for virtual machine migration. Processing logic may modify the availability status of the virtual function to indicate that it is no longer available for assignment. This can prevent the virtual function from being assigned elsewhere while the virtual machine is being migrated.

At block 402, processing logic determines whether there is an existing virtual bridge on the destination hypervisor to support connectivity for the migrating virtual machine. If not, processing logic continues to block 403. Otherwise, processing logic proceeds to block 404.

At block 403, processing logic creates a temporary virtual network associated with the identified logical network on the destination hypervisor supporting virtual function capability. In certain implementations, the temporary virtual network may be composed of a connection between the virtual machine and the identified logical network without virtual function capability (e.g., non-SR-IOV capable). For example, the temporary virtual network may be a virtual bridge, virtual switch, or VLAN that connects the virtual machine to the physical device associated with the logical network without an associated virtual function.

At block 404, processing logic migrates the virtual machine state to the destination hypervisor supporting virtual function capability using any available live migration technique (e.g., pre-copy, post-copy, etc.). The state of the virtual machine may comprise a predetermined state of various components of the virtual machine that are necessary for the virtual machine to begin execution on the destination host. For example, the state of the virtual machine may comprise a device state, the state of CPU registers, the pages of memory that are currently being accessed by the virtual machine, or the like. The state of the virtual machine may be migrated by copying the state from the source host to the destination host directly through the network, placing the state in a shared space for the destination host to retrieve, or in any other manner.

At block 405, processing logic connects the virtual machine to the temporary virtual network on the destination hypervisor. Processing logic can connect the virtual machine to the temporary virtual network by connecting the virtual interface of the virtual machine to the virtual bridge from the temporary virtual network. At block 406, processing logic branches depending on whether the virtual machine was migrated and connected to the temporary virtual network successfully. If so, processing logic continues to block 407. Otherwise processing logic proceeds to block 409.

At block 407, processing logic disconnects the virtual machine from the temporary virtual network. At block 408, processing logic connects the virtual machine to the virtual function associated with the logical network required by the virtual machine. Processing logic may first configure the virtual interface of the virtual machine to connect to the identified virtual function. In some implementations, processing logic may configure the virtual interface as a 'passthrough' to the virtual function and configure the virtual network parameters of the virtual function. The virtual network parameters may include a maximum transmission unit (MTU) that defines the maximum size of a packet that can be transferred in one frame over a network, a virtual local area network (VLAN) tag that identifies the VLAN associated with the virtual network for packet transmission, a media access control (MAC) address that identifies the interface for communication across the network, or similar network parameters.

After block 408, processing proceeds to block 410. At block 409, processing logic modifies the availability status of the virtual function to indicate that the virtual function is available for use. At block 410, processing logic removes the temporary virtual network from the destination hypervisor. In some implementations, if processing logic determines that the virtual bridge used in the temporary network is used by other virtual machines, processing logic may instead bypass block 410, leaving the virtual bridge on the destination hypervisor. After block 410, the method of FIG. 4 terminates.

Figure 5:
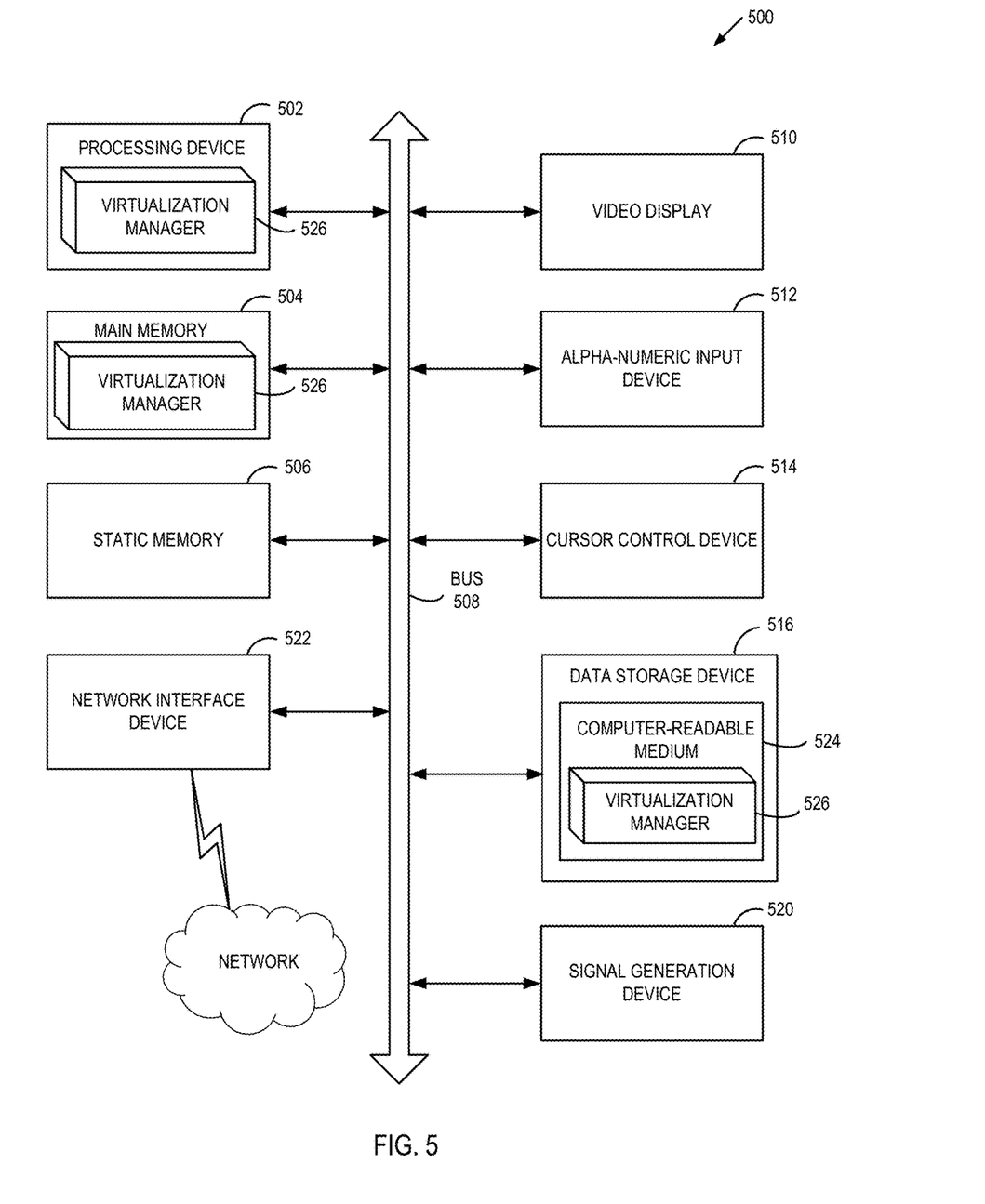
FIG. 5 depicts a block diagram of an illustrative computer system operating in accordance with examples of the invention.

FIG. 5 depicts an example computer system 500 which can perform any one or more of the methods described herein. In one example, computer system 500 may correspond to network architecture 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary network architecture 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute virtualization manager 526 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored virtualization manager 526 (e.g., corresponding to the methods of FIGS. 3-4, etc.) embodying any one or more of the methodologies or functions described herein. Virtualization manager 526 may also reside, completely or at least partially, within the main memory 504 and/or within the processing device 502 during execution thereof by the computer system 700, the main memory 504 and the processing device 502 also constituting computer-readable media. Virtualization manager 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "identifying," "migrating," "connecting," "modifying," "creating," "disconnecting," "removing," "configuring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving, by a processing device executing a virtualization manager, a request to migrate a virtual machine from a source hypervisor to a destination hypervisor;
   identifying a logical network associated with the virtual machine on the source hypervisor;
   identifying a virtual function associated with the logical network on the destination hypervisor in view of an availability status that indicates whether the virtual function is available for use;
   responsive to determining that the availability status indicates that the virtual function is available for use on the destination hypervisor, modifying the availability status to indicate that the virtual function is no longer available, and
   migrating, by the processing device executing the virtualization manager, the virtual machine from the source hypervisor to the destination hypervisor;
   responsive to determining that the virtual machine has been migrated to the destination hypervisor successfully, connecting, by the processing device executing the virtualization manager, the identified virtual function to the virtual machine; and
   responsive to determining that the migration of the virtual machine to the destination hypervisor has not been completed successfully, modifying the availability status to indicate that the virtual function is available for use on the destination hypervisor.

2. The method of claim 1, further comprising:
   creating a temporary virtual network associated with the identified logical network on the destination hypervisor.

3. The method of claim 2, wherein the temporary virtual network comprises a connection between a virtual bridge and a networking device associated with the identified logical network.

4. The method of claim 2, wherein migrating the virtual machine comprises:
   connecting a virtual interface of the virtual machine to the temporary virtual network on the hypervisor.

5. The method of claim 4, further comprising:
   disconnecting the virtual interface of the virtual machine from the temporary virtual network; and
   removing the temporary virtual network from the destination hypervisor.

6. The method of claim 5, further comprising:
   configuring the virtual interface to connect to the identified virtual function.

7. A computing apparatus comprising: a memory; and
   a processing device, operatively coupled to the memory, to execute a virtualization manager to:
   receive a request to migrate a virtual machine from a source hypervisor to a destination hypervisor;
   identify a logical network associated with the virtual machine on the source hypervisor;
   identifying a virtual function associated with the logical network on the destination hypervisor in view of an availability status that indicates whether the virtual function is available for use;
   responsive to determining that an availability status indicates that a virtual function is available for use on the destination hypervisor by the virtual machine, modify the availability status to indicate that the virtual function is no longer available, and
   migrate, by the virtualization manager, the virtual machine from the source hypervisor to the destination hypervisor;
   responsive to determining that the virtual machine has been migrated to the destination hypervisor successfully, connect, by the virtualization manager, the virtual function to the virtual machine; and
   responsive to determining that the migration of the virtual machine to the destination hypervisor has not been completed successfully, modify the availability status to indicate that the virtual function is available for use on the destination hypervisor.

8. The apparatus of claim 7, wherein the processing device is further to:
   identify a logical network associated with the virtual machine on the source hypervisor;
   identify the virtual function associated with the logical network on the destination hypervisor in view of the availability status that indicates whether the virtual function is available for use; and
   create a temporary virtual network associated with the identified logical network on the destination hypervisor.

9. The apparatus of claim 8, wherein the temporary virtual network comprises a connection between a virtual bridge and a networking device associated with the identified logical network.

10. The apparatus of claim 8, wherein to migrate the virtual machine, the processing device is to:
    connect a virtual interface of the virtual machine to the temporary virtual network on the hypervisor.

11. The apparatus of claim 10, wherein the processing device is further to:
  disconnect the virtual interface of the virtual machine from the temporary virtual network; and
  remove the temporary virtual network from the destination hypervisor.

12. The apparatus of claim 11, wherein the processing device is further to:
  configure the virtual interface to connect to the identified virtual function.

13. A non-transitory computer readable storage medium, having instructions stored therein, which when executed by a processing device of a computer system, cause the processing device to:
  receive, by the processing device executing a virtualization manager, a request to migrate a virtual machine from a source hypervisor to a destination hypervisor;
  identify a logical network associated with the virtual machine on the source hypervisor;
  identifying a virtual function associated with the logical network on the destination hypervisor in view of an availability status that indicates whether the virtual function is available for use;
  responsive to determining that the availability status indicates that the virtual function is available for use on the destination hypervisor, modify the availability status to indicate that the virtual function is no longer available, and
  migrate, by the processing device executing the virtualization manager, the virtual machine from the source hypervisor to the destination hypervisor; create a temporary virtual network associated with the identified logical network on the destination hypervisor;
  responsive to determining that the virtual machine has been migrated to the destination hypervisor successfully, connect, by the processing device executing the virtualization manager, the identified virtual function to the virtual machine; and
  responsive to determining that the migration of the virtual machine to the destination hypervisor has not been completed successfully, modify the availability status to indicate that the virtual function is available for use on the destination hypervisor.

14. The non-transitory computer readable storage medium of claim 13, wherein the temporary virtual network comprises a connection between a virtual bridge and a networking device associated with the identified logical network.

15. The non-transitory computer readable storage medium of claim 13, wherein to migrate the virtual machine, the processing device is to:
  connect a virtual interface of the virtual machine to the temporary virtual network on the hypervisor.

16. The non-transitory computer readable storage medium of claim 15, wherein the processing device is further to:
  disconnect the virtual interface of the virtual machine from the temporary virtual network; and
  remove the temporary virtual network from the destination hypervisor.

17. The non-transitory computer readable storage medium of claim 16, wherein the processing device is further to:
  configure the virtual interface to connect to the identified virtual function.

* * * * *

UNITED STATES PATENT AND TRADEMARK OFFICE
CERTIFICATE OF CORRECTION

PATENT NO.       : 9,792,138 B2
APPLICATION NO.  : 14/625560
DATED            : October 17, 2017
INVENTOR(S)      : Alona Kaplan et al.

Page 1 of 1

It is certified that error appears in the above-identified patent and that said Letters Patent is hereby corrected as shown below:

On the Title Page

Item (54), Title of the invention should read "VIRTUAL MACHINE MIGRATION TO HYPERVISORS WITH VIRTUAL FUNCTION CAPABILITY"

Signed and Sealed this
Twenty-sixth Day of February, 2019

Andrei Iancu
*Director of the United States Patent and Trademark Office*